United States Patent
Fung et al.

(10) Patent No.: US 10,380,438 B2
(45) Date of Patent: Aug. 13, 2019

(54) SYSTEM AND METHOD FOR VEHICLE CONTROL BASED ON RED COLOR AND GREEN COLOR DETECTION

(71) Applicant: Honda Motor Co., Ltd., Tokyo (JP)

(72) Inventors: Kin C. Fung, Dublin, OH (US);
Timothy J. Dick, Dublin, OH (US);
Dhanashree Palande, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 15/450,184

(22) Filed: Mar. 6, 2017

(65) Prior Publication Data
US 2018/0253613 A1   Sep. 6, 2018

(51) Int. Cl.
| G06K 9/00 | (2006.01) |
| G06K 9/46 | (2006.01) |
| G08G 1/0962 | (2006.01) |
| G08G 1/0967 | (2006.01) |

(52) U.S. Cl.
CPC ....... *G06K 9/00825* (2013.01); *G06K 9/4652* (2013.01); *G08G 1/09623* (2013.01); *G08G 1/096725* (2013.01)

(58) Field of Classification Search
CPC .......... G06K 9/00825; G06K 9/00845; G06K 9/4652; G08G 1/0962
See application file for complete search history.

(56) References Cited

U.S. PATENT DOCUMENTS

| 7,365,769 | B1 | 4/2008 | Mager | |
| 7,466,841 | B2* | 12/2008 | Bahlmann | G06K 9/00818 |
| | | | | 382/103 |
| 8,324,552 | B2 | 12/2012 | Schofield et al. | |
| 9,318,020 | B2 | 4/2016 | Salomonsson et al. | |
| 9,721,171 | B2* | 8/2017 | Moesle | G06K 9/00825 |

(Continued)

FOREIGN PATENT DOCUMENTS

WO   WO-2016203616 A1 * 12/2016 ............... G06T 1/00

OTHER PUBLICATIONS

Diaz, M., et al., A Survey on Traffic Light Detection, Conference: New Trends in Image Analysis and PRocessins—ICIAP 2015 Workshops, LEcture Notes in COmputer Science (LNCS) 9281, pp. 1-8, Springer International Publishing Switzerland. (Year: 2015).*

(Continued)

*Primary Examiner* — Brenda C Bernardi
(74) *Attorney, Agent, or Firm* — Rankin, Hill & Clark LLP

(57) ABSTRACT

A method for vehicle control includes receiving a color image from an imaging system. The color image includes a traffic indicator with a color portion. The method includes extracting red color components from the color image by subtracting a grayscale intensity value of each pixel from a red-scale value of each pixel. The method includes extracting green color components from the color image by subtracting the grayscale intensity value of each pixel from a green-scale value of each pixel. The method includes performing blob analysis based on the red color components and the green color components. The method includes determining, based on the blob analysis, a color of the color portion of the traffic indicator, and controlling a vehicle system of a vehicle based on the color of the color portion of the traffic indicator.

20 Claims, 9 Drawing Sheets

(56) References Cited

U.S. PATENT DOCUMENTS

| | | | |
|---|---|---|---|
| 9,747,508 B2* | 8/2017 | Mizutani | G06K 9/00825 |
| 9,779,315 B2* | 10/2017 | Yamanoi | G01C 21/26 |
| 9,792,519 B2* | 10/2017 | Kido | G06K 9/2018 |
| 9,796,386 B2* | 10/2017 | Ferguson | G05D 1/0231 |
| 9,857,800 B2* | 1/2018 | Ben Shalom | B60W 30/00 |
| 2005/0036660 A1 | 2/2005 | Otsuka et al. | |
| 2006/0280361 A1* | 12/2006 | Umeda | G06K 9/0061 |
| | | | 382/167 |
| 2011/0182475 A1* | 7/2011 | Fairfield | G06K 9/00825 |
| | | | 382/104 |
| 2011/0291859 A1 | 12/2011 | Kreis et al. | |
| 2012/0140084 A1* | 6/2012 | Wang | G06T 7/001 |
| | | | 348/207.1 |
| 2012/0200490 A1* | 8/2012 | Inada | A61B 3/113 |
| | | | 345/156 |
| 2012/0215403 A1* | 8/2012 | Tengler | B60W 50/12 |
| | | | 701/36 |
| 2012/0242819 A1* | 9/2012 | Schamp | G08B 21/06 |
| | | | 348/78 |
| 2012/0269391 A1* | 10/2012 | Saito | G08G 1/165 |
| | | | 382/103 |
| 2012/0288145 A1* | 11/2012 | Kido | G06K 9/00791 |
| | | | 382/103 |
| 2012/0288146 A1* | 11/2012 | Kido | G06K 9/00805 |
| | | | 382/103 |
| 2012/0288149 A1* | 11/2012 | Kido | G06K 9/00825 |
| | | | 382/103 |
| 2012/0288150 A1* | 11/2012 | Kido | G06K 9/2018 |
| | | | 382/103 |
| 2012/0288151 A1* | 11/2012 | Kido | G08G 1/165 |
| | | | 382/103 |
| 2013/0253754 A1* | 9/2013 | Ferguson | G05D 1/0231 |
| | | | 701/28 |
| 2013/0342698 A1* | 12/2013 | Thompson | G06K 9/00798 |
| | | | 348/148 |
| 2014/0132769 A1* | 5/2014 | Kido | G06K 9/00791 |
| | | | 348/148 |
| 2015/0009318 A1 | 1/2015 | Peng | |
| 2015/0109429 A1* | 4/2015 | Inoue | A61B 5/18 |
| | | | 348/78 |
| 2015/0124096 A1* | 5/2015 | Koravadi | G06K 9/00825 |
| | | | 348/148 |
| 2015/0294167 A1* | 10/2015 | Zhang | G06K 9/00825 |
| | | | 382/103 |
| 2016/0148063 A1* | 5/2016 | Hong | G06K 9/00825 |
| | | | 382/103 |
| 2016/0156881 A1* | 6/2016 | Guan | H04N 7/185 |
| | | | 348/148 |
| 2016/0284100 A1* | 9/2016 | Sharma | G06T 7/11 |
| 2016/0301923 A1* | 10/2016 | Ichige | H04N 13/239 |
| 2016/0328629 A1* | 11/2016 | Sinclair | H04N 5/2253 |
| 2016/0328975 A1* | 11/2016 | Tokita | B60W 30/09 |
| 2016/0371552 A1* | 12/2016 | Oki | G06K 9/00825 |
| 2016/0379069 A1* | 12/2016 | Kasaoki | G06K 9/00825 |
| | | | 348/148 |
| 2016/0379070 A1* | 12/2016 | Kasaoki | G06K 9/00825 |
| | | | 348/148 |
| 2017/0017850 A1* | 1/2017 | Oki | G06K 9/00825 |
| 2017/0024622 A1* | 1/2017 | Mizutani | G06K 9/00825 |
| 2017/0043715 A1* | 2/2017 | Osugi | G08G 1/16 |
| 2017/0091566 A1* | 3/2017 | Kasaoki | H04N 5/2353 |
| 2017/0103274 A1* | 4/2017 | Oki | H04N 7/183 |
| 2017/0103275 A1* | 4/2017 | Yamanoi | G01C 21/26 |
| 2017/0120821 A1* | 5/2017 | Guan | G06K 9/00825 |
| 2017/0144585 A1* | 5/2017 | Ogawa | G06K 9/4661 |
| 2017/0178322 A1* | 6/2017 | Hakuk | G06T 7/0012 |
| 2017/0206427 A1* | 7/2017 | Ginsberg | G06F 19/3481 |
| 2017/0223367 A1* | 8/2017 | Stessen | H04N 1/6027 |
| 2017/0262709 A1* | 9/2017 | Wellington | G06K 9/00791 |
| 2017/0372160 A1* | 12/2017 | Kido | G06K 9/2018 |
| 2018/0022358 A1* | 1/2018 | Fung | B60W 40/08 |
| | | | 701/36 |

OTHER PUBLICATIONS

Diaz-Cabrera, M., et al., Suspended Traffic Lights Detection and Distance Estimation Using Color Features, 15th International IEEE COnference on Intelligent Transportation Systems, 2012, pp. 1315-1320. (Year: 2012).*

Fairfield, N., et al., Traffic Light Mapping and Detection, International Conference on Robotics and Automation (ICRA), 2011, pp. 5421-5426, IEEE. (Year: 2011).*

Haltakov, V., et al., Semantic Segmentation Based Traffic Light Detection at Day and at Night, Pattern REcognition, Lecture Notes in Computer Science (LNCS) 9358, Oct. 2015, pp. 446-457. (Year: 2015).*

Omachi, M., et al., Traffic Light Detection with Color and Edge Information, International Conference on Computer Science and Information Technology, 2009, pp. 284-287, IEEE. (Year: 2009).*

Zhang, Y., et al., A Multi-Feature Fusion Based Traffic Light Recognition Algorithm for Intelligent Vehicles, Proceedings of the 33rd Chinese Control Conference (CCC), 2014, pp. 4924-4929, IEEE. (Year: 2014)*

Yang, X., et al., A Real Time Traffic Light Recognition System, International Journal of Information Acquisition, 2008, vol. 5, No. 2, pp. 149-161, World Scientific Publishing Company. (Year: 2008).*

Zhou, X., et al., A Traffic Light Recognition Algorithm Based on Compressive Tracking, International Journal of Hybrid Information Technology, 2015, vol. 8, No. 6, pp. 323-332. (Year: 2015).*

Sung et al., "Real-time Traffic Light Recognition on mobile Devices with Geometry-Based Filtering", Department of Computer Science and Information Engineering, Department of Electrical Engineering, National Taiwan University, Taipei, Taiwan, 7 pages.

* cited by examiner

SYSTEM AND METHOD FOR VEHICLE CONTROL BASED ON RED COLOR AND GREEN COLOR DETECTION

BACKGROUND

Advanced Driver Assistance Systems (ADAS) can use detection of traffic lights and/or traffic signs to provide vehicle safety and convenience functions. In particular, ADAS can accurately distinguishing various features of a driving scene to determine when control and what type of control is required. For example, red color (e.g., red light) must be distinguished from green color (e.g., green light). In some scenarios, different types of traffic indicators must also be distinguished (e.g., traffic light, vehicle brake lights). Furthermore, recognition of red color and green color along with information about the driver can be used to infer the driver's intent and control the vehicle to provide an adequate response and/or warning. For example, driver information (e.g., eye gaze, head pose, use of a mobile device) can be used in addition to detection of driving scene features to provide vehicle safety and convenience functions.

BRIEF DESCRIPTION

According to one aspect, a computer-implemented method for vehicle control may include receiving a color image from an imaging system and extracting red color components from the color image by subtracting a grayscale intensity value of each pixel in the color image from a red-scale value of each pixel in the color image. Further, the method can include extracting green color components from the color image by subtracting the grayscale intensity value of each pixel in the color image from a green-scale value of each pixel in the color image. The method can include performing blob analysis based on the red color components and the green color components, and determining, based on the blob analysis, a color of the color portion of the traffic indicator. The method can also include controlling a vehicle system of a vehicle based on the color of the color portion of the traffic indicator.

According to another aspect, a vehicle image processing system can include an imaging system to capture a color image. The color image may include a traffic indicator having a color portion. A processor can be operably connected for computer communication to the imaging system. The processor can receive the color image from the imaging system, and extract red color components from the color image and green color components from the color image by subtracting grayscale intensity values of each pixel in the color image from respective red-scale values and green-scale values of each pixel in the color image. Further, the processor can perform blob analysis based on the red color components and the green color components, and determine, based on the blob analysis, a color of the color portion of the traffic indicator. The processor can execute control of a vehicle system of a vehicle based on the color of the color portion of the traffic indicator.

According to a further aspect, a non-transitory computer-readable storage medium can include, instructions that when executed by a processor, cause the processor to: receive a color image from an imaging system. The color image can include a traffic indicator including a color portion. The processor can extract red color components from the color image by subtracting a grayscale intensity value of each pixel in the color image from a red-scale value of each pixel in the color image, and extract green color components from the color image by subtracting the grayscale intensity value of each pixel in the color image from a green-scale value of each pixel in the color image. Further, the processor can perform blob analysis based on the red color components and the green color components, and determine, based on the blob analysis, a color of the color portion of the traffic indicator. The processor can control a vehicle system of a vehicle based on the color of the color portion of the traffic indicator.

DETAILED DESCRIPTION

Figure 1:
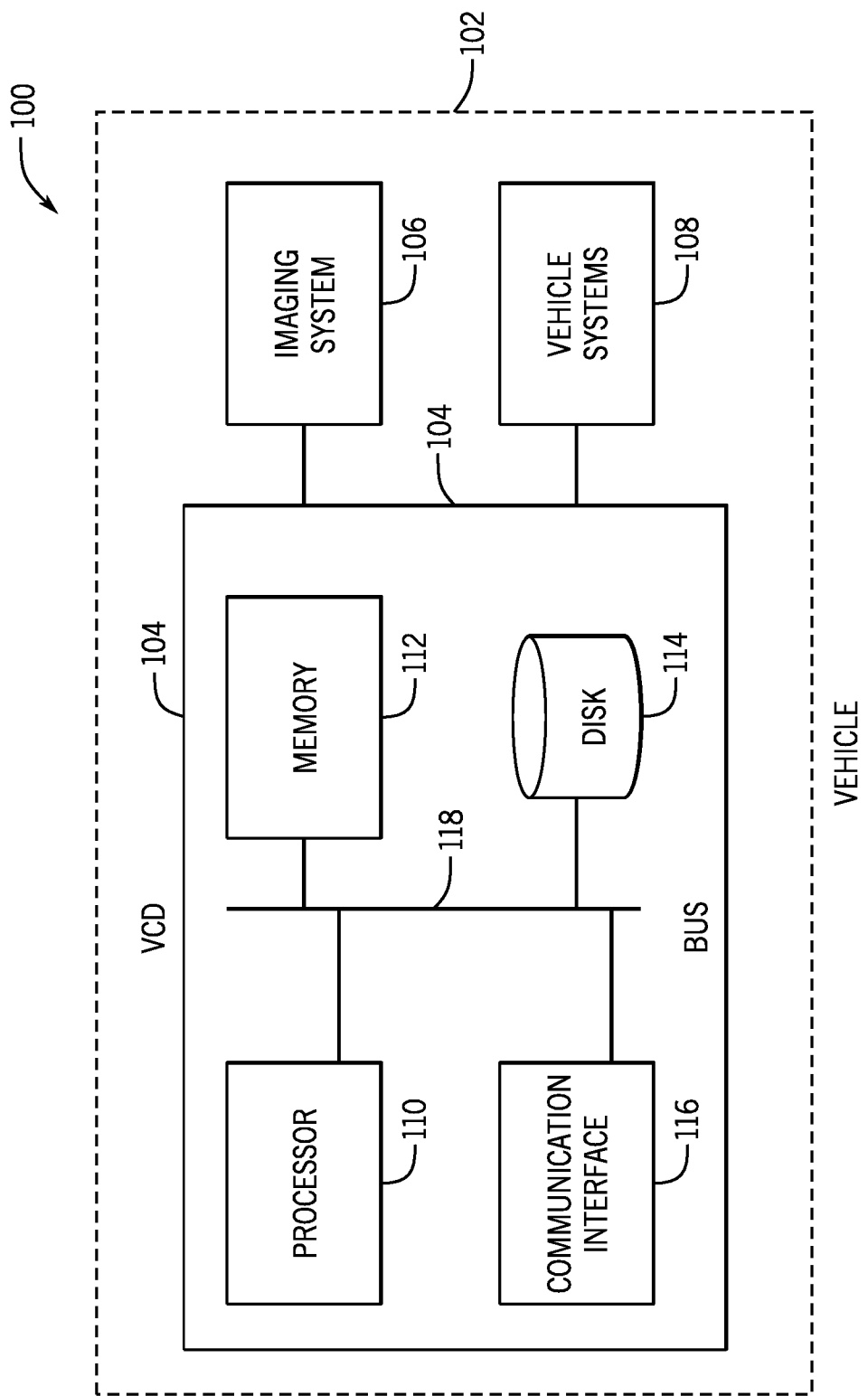
FIG. 1 is a block diagram illustrating a system for vehicle control based on red color and green color detection according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A "vehicle sensor," as used herein can include, but is not limited to, any sensor used in any vehicle system for detecting a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

Referring now to the drawings, wherein the showings are for purposes of illustrating one or more exemplary embodiments and not for purposes of limiting the same, FIG. 1 is a block diagram of an exemplary vehicle image processing system 100 for implementing vehicle control based on red color and green color detection according to an exemplary embodiment. The components of the system 100, as well as the components of other systems, hardware architectures, and software architectures discussed herein, can be combined, omitted, or organized into different architectures for various embodiments. The system 100 can be part of a vehicle 102, and can include a vehicle computing device (VCD) 104, an imaging system 106, and vehicle systems 108. The VCD 104 can include provisions for processing, communicating and interacting with various components of the vehicle 102 and other components of the system 100. In one embodiment, the VCD 104 can be implemented with the vehicle 102, for example, as part of a telematics unit, a head unit, a navigation unit, an infotainment unit, an electronic control unit, among others. In other embodiments, the VCD 104 can be implemented remotely from the vehicle 102, for example, with a portable device (not shown) or a device connected via a network (not shown).

The VCD 104 can use the imaging system 106 to capture images surrounding the environment of the vehicle 102. For example, the imaging system 106 can capture color images of a space within the front path (e.g., forward looking) of the vehicle 102. The imaging system 106 can include one or more cameras (e.g., stereo cameras, three-dimensional cameras, image sensors) that may be mounted on the vehicle, for example, mounted on a windshield, a front dashboard, a grill, a rear-view mirror, among others. In another embodiment, the imaging system 106 can include a portable device (not shown) with image capture hardware and functionality (e.g., a camera). The color images provided by the imaging system 106 are in two-dimensional format, however, other formats (e.g., stereo images, three-dimensional images) can also be provided. In some embodiments, the imaging system 106 can capture color images at different time intervals. The VCD 104 and/or the imaging system 106 can process the color images to detect red color and green color.

In some embodiments, the imaging system 106 can be controlled for image pre-processing and/or camera customization. The settings of the imaging system 106 can be controlled and/or customized to ensure that the image captured enhances red and green colors using light noise reductions. In other embodiments, post-processing of the image captured, as discussed in the methods herein, can include filtering techniques to enhance the red and green colors and reduce light noise reduction from day time processing.

In the systems and methods discussed herein, the color image captured by the imaging system 106 can include a traffic indicator having a color portion. A traffic indicator can include a traffic light, a traffic sign, one or more brake lights, one or more turn signals, among others. In some embodiments, the traffic indicator can be a signaling device positioned at road intersections, pedestrian crossings, and other locations to control flows of traffic on a road. The traffic indicator can include an illuminated portion emitting a colored light. In this embodiment, the color portion of the traffic indicator can include the illuminated portion. In other embodiments, the traffic indicator is unilluminated, but has one or more color portions.

Figure 2A:
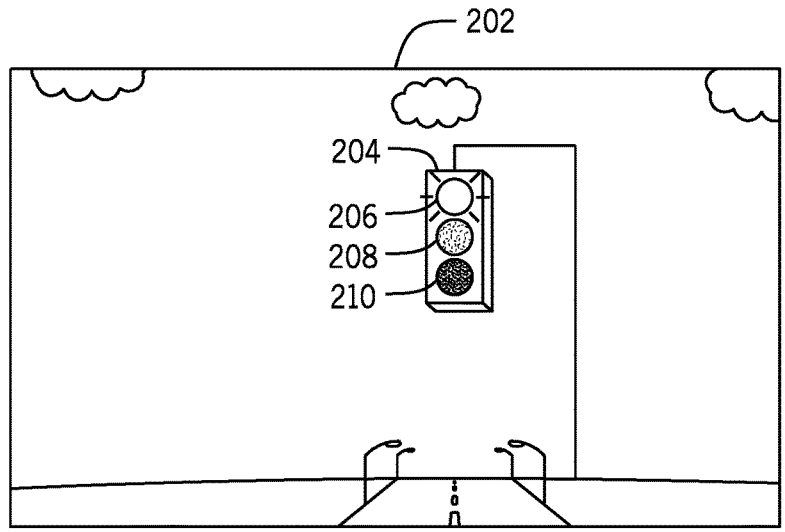
FIG. 2A illustrates an example image including traffic indicators, namely, a traffic light according to an exemplary embodiment.

Exemplary color images and traffic indicators will now be described with reference to FIGS. 1, 2A, 2B, 2C, and 2D. FIG. 2A is an exemplary color image 202 captured by the imaging system 106. The color image 202 includes a forward looking view of the vehicle 102. In particular, the color image 202 includes a traffic indicator 204, namely, a traffic light that can be positioned on a road (e.g., at an intersection) on which the vehicle 102 is travelling. The traffic indicator 204 includes three light signals. A red light signal 206 can emit a red colored light, a yellow light signal 208 can emit a yellow colored light, and a green light signal 210 can emit a green colored light. It is understood that different configurations of the traffic indicator 204 (e.g., different shapes, different number of light signals) not shown in FIG. 2A, can be implemented with the methods and systems discussed herein.

The red light signal 206, the yellow light signal 208, and the green light signal 210, when activated, can be a color portion of the traffic indicator 204. In FIG. 2A, the red light signal 206 is activated (i.e., emitting a red colored light), while the yellow light signal 208, and the green light signal 210 are deactivated. In this example, the systems and methods discussed herein facilitate recognition of the red color of the color portion (e.g., the red light signal 206) of the traffic indicator 204. Further, in this example, the red light signal 206, the yellow light signal 208, and the green light signal 210, when activated, can be illuminated portions of the traffic indicator 204. In FIG. 2A, the red light signal 206 is activated, thus, the red light signal 206 can be an illuminated portion.

Figure 2B:
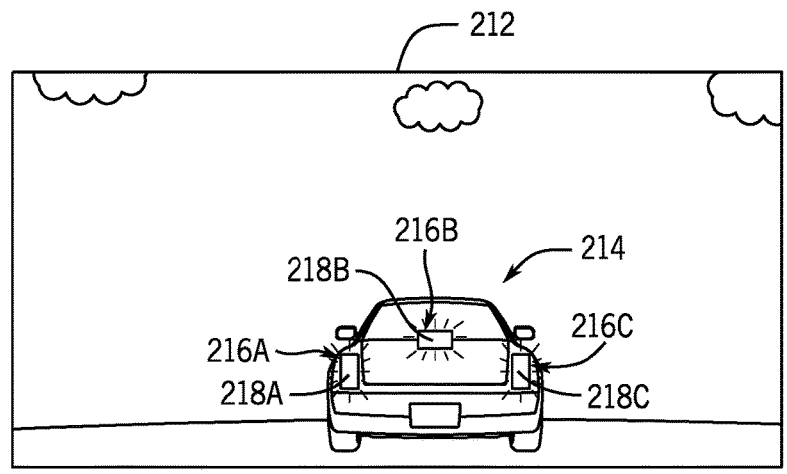
FIG. 2B illustrates an example image including traffic indicators, namely, brake lights on a target vehicle in front of a host vehicle according to an exemplary embodiment.

Referring now to FIG. 2B, another exemplary color image 212 is shown. The color image 212 is a forward looking view of the vehicle 102 including a target vehicle 214 located in front of the vehicle 102. In this example, the color image 212 includes a first traffic indicator 216a, a second traffic indicator 216b, and a third traffic indicator 216c, which are brake lights mounted on the target vehicle 214. Although each brake light is discussed as a separate traffic indicator herein, it is understood that all of the brake lights can be collectively referred to as a traffic indicator. Further, it is understood that different configurations of the first traffic indicator 216a, the second traffic indicator 216b, and the third traffic indicator 216c (e.g., different shapes, different number of light signals) not shown in FIG. 2B, can be implemented with the methods and systems discussed The first traffic indicator 216a includes a first light signal 218a that can emit a colored light (e.g., red, yellow) in conjunction with a braking system (not shown) and/or a turn signal system (not shown) of the target vehicle 214. Similarly, the second traffic indicator 216b includes a second light signal 218b that can emit a colored light (e.g., red, yellow) in conjunction with a braking system and/or a turn signal system of the target vehicle 214. Further, the third traffic indicator 216c includes a third light signal 218c that can emit a colored light (e.g., red, yellow) in conjunction with a braking system and/or a turn signal system of the target vehicle 214. The first light signal 218a, the second light signal 218b, and the third light signal 218c, when activated (e.g., when emitting a colored light) can each be a color portion of the respective traffic indicator. In some embodiments, the first light signal 218a, the second light signal 218b, and the third light signal 218c, when activated, can be illuminated portions of the respective traffic indicators. In FIG. 2B, the first light signal 218a, the second light signal 218b, and the third light signal 218c are shown in an activated state, each emitting a red colored light. Thus, in some embodiments, the first light signal 218a, the second light signal 218b, and the third light signal 218c are considered illuminated portions of the respective traffic indicators.

Figure 2C:
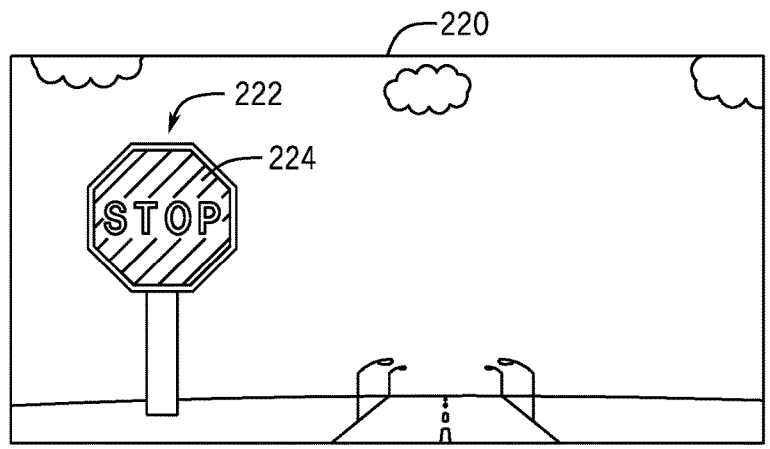
FIG. 2C illustrates an example image including a traffic indicator, namely, a traffic sign according to an exemplary embodiment.

Referring now to FIG. 2C, another exemplary color image 220 is shown. The color image 220 is a forward looking view of the vehicle 102 including a traffic indicator 222. Specifically, the traffic indicator 222 in FIG. 2C is a typical stop sign, however, it is understood that other types of signs and other configurations different than those shown in FIG. 2C can be implemented. The traffic indicator 222 includes a color portion 224. Here, the color portion is a red color. The color portion 224 is not an illuminated portion in FIG. 2C, however, it is understood that the color portion 224 can be an illuminated portion in other embodiments.

Figure 2D:
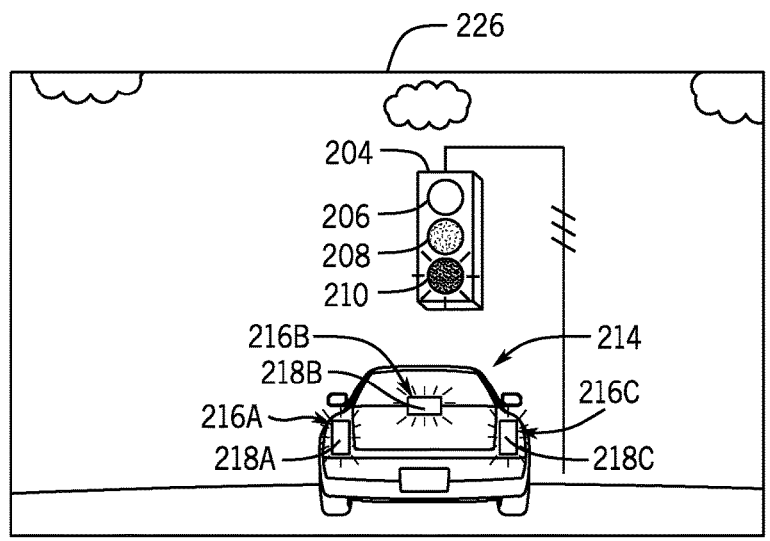
FIG. 2D illustrates an example image including a first traffic indicator and a second traffic indicator, namely, a traffic light and brake lights on a target vehicle according to an exemplary embodiment.

A further exemplary color image 226 is shown in FIG. 2D. FIG. 2D illustrates a driving scenario with the traffic indicator 204 as shown in FIG. 2A and the first traffic indicator 216a, the second traffic indicator 216b, and the third traffic indicator 216c shown in FIG. 2B. For simplicity, like numerals in FIGS. 2A, 2B, and 2D represent like components. In the example shown in FIG. 2D, and in contrast to the example shown in FIG. 2A, the green light signal 210 is activated (i.e., emitting a green colored light) and the red light signal 206 is deactivated. With respect to the target vehicle 214, the first light signal 218a, the second light signal 218b, and the third light signal 218c are shown in an activated state, each emitting a red colored light. Accordingly, in FIG. 2D, the color image 226 includes a green color portion (i.e., the green light signal 210) and a red color portion (i.e., the first light signal 218a, the second light signal 218b, and the third light signal 218c). The color images shown in FIGS. 2A, 2B, 2C, and 2D will be used as examples herein for recognition of red color and green color.

Figure 2E:
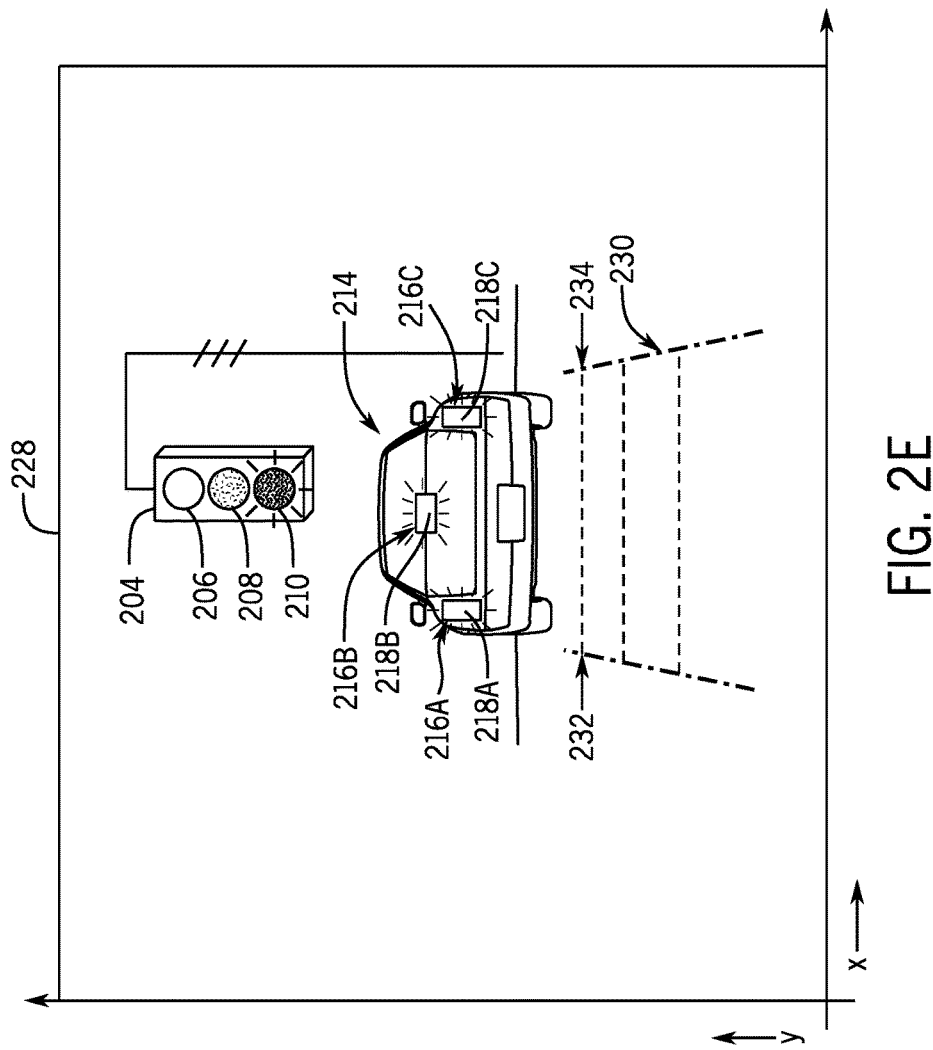
FIG. 2E illustrates the example image of FIG. 2D including traffic indicator classification according to an exemplary embodiment.

A further exemplary color image 228 is shown in FIG. 2E, which is similar to the color image 226, but with a detailed illustration of traffic indicator classification according to one embodiment. The color image 228 is shown according to an x-axis and y-axis coordinate system, although other coordinate systems can be implemented. As will be discussed herein, in some embodiments, detecting red and green color includes classification of traffic indicators. For example, traffic indicators can be classified as brake lights, tail lights, traffic lights, and/or traffic signs. In some embodiments, image processing including machine learning algorithms can be utilized for classification of traffic indicators.

In FIG. 2E, the vehicle 214 is travelling on in a road lane 230. The imaging system 106 and/or the vehicle systems 108 (e.g., lane keeping assist system can identify the lane lines of the road lane 230. For example, in FIG. 2E, the road lane 230 includes a left lane line 232 and a right lane line 234. In one embodiment, if more than one traffic indicator (e.g., more than one anomaly) is detected within a horizontal plane of the x-axis and the more than one traffic indicator is detected inside the lane boundaries (e.g., the left lane line 232 and the right lane line 234), the traffic indicators are classified as brake lights. On the other hand, if a traffic indicator is detected outside of the lane boundaries (e.g., the left lane line 232 and the right lane line 234), the traffic indicators are classified as a traffic light and/or a traffic sign. In some embodiments, classification can also be performed based on the shapes of the traffic indicators.

Referring again to FIG. 1, the VCD 104 can also use the vehicle systems 108 to obtain vehicle information about the vehicle 102. As mentioned above, the vehicle systems 108 can include, but are not limited to, any automatic or manual systems that can be used to enhance the vehicle, driving, and/or safety. It is understood that the vehicle systems 108 can include various vehicle sensors (not shown) that sense and measure different stimuli (e.g., a signal, a property, a measurement, a quantity) associated with the vehicle 102 and/or a particular vehicle system 108. For example, other vehicle sensors can include cameras mounted to the interior or exterior of the vehicle (e.g., as part of the imaging system 106), radar and laser sensors mounted to the exterior of the vehicle, external cameras, radar and laser sensors (e.g., on other vehicles in a vehicle-to-vehicle network, street cameras, surveillance cameras). The sensors can be any type of sensor, for example, acoustic, electric, environmental, optical, imaging, light, pressure, force, thermal, temperature, proximity, among others.

The vehicle systems 108 can include Advanced Driver Assistance Systems (ADAS), for example, an adaptive cruise control system, a blind spot monitoring system, a collision mitigation system, a lane departure warning system, among others. In some embodiments, one or more of the vehicle systems 108 can include vehicle sensors for detecting objects surrounding the vehicle 102. For example, proximity sensors, radar sensors, laser sensors, LIDAR sensors, and other optical sensors, can be used to detect objects surrounding the vehicle 102. As will be discussed herein, these sensors can be used to determine whether a target vehicle (e.g., the target vehicle 214 of FIG. 2B) is in front of the vehicle 102 and a distance between the target vehicle and the vehicle 102.

In some embodiments, the VCD 104 can obtain and communicate data representing the stimulus from the vehicle sensors. This data can include and/or be processed into vehicle data. Vehicle data includes data related to the vehicle 102 and/or the vehicle systems 108. Specifically, vehicle data can include conditions, states, statuses, behaviors associated with vehicle 102 and/or the vehicle system 108, and information about the external environment of the vehicle 102 (e.g., other vehicles, pedestrians, objects, road conditions, weather conditions). Exemplary vehicle data includes, but is not limited to, acceleration information, velocity information, steering information, lane departure information, blind spot monitoring information, braking information, collision warning information, navigation information, collision mitigation information and cruise control information.

Additionally, the vehicle systems 108 can also provide data about a driver and/or vehicle occupants (not shown) in the vehicle. For example, the vehicle systems 108 can automatic or manual systems and sensors that monitor and provide information related to a driver, for example, heat rate, respiratory rate, eye movements, head movements, body movements, hand postures, hand placement, body posture, and gesture recognition, among others.

Referring again to the VCD 104 of FIG. 1, the VCD 104 can generally include a processor 110, a memory 112, a disk 114, and a communication interface 116, which are each operably connected for computer communication via a bus 118 and/or other wired and wireless technologies. The processor 110 can include logic circuitry (not shown) with hardware, firmware, and software architecture frameworks for facilitating hybrid speech data processing with the components of the system 100. Thus, in some embodiments, the processor 110 can store application frameworks, kernels, libraries, drivers, application program interfaces, among others, to execute and control hardware and functions discussed herein.

In some embodiments, the memory 112 and/or the disk 114 can store similar components as the processor 110 for execution by the processor 110. The communication interface 116 can include software and hardware to facilitate data input and output between the components of the VCD 104 and other components of the system 100. Specifically, the communication interface 116 can include network interface controllers (not shown) and other hardware and software that manages and/or monitors connections and controls bi-directional data transfer between the communication interface 116 and other components of the system 100.

The system 100 of FIG. 1 will now be described in more detail with reference to FIG. 3 and a method 300 for vehicle control based on red color and green color detection according to an exemplary embodiment. Further, method 300 will be described with respect to the illustrative examples shown in FIGS. 2A, 2B, 2C, and 2D. For simplicity, the elements and configuration of the components of FIGS. 1, 2A, 2B, 2C, and 2D will be used throughout the description. At block 302, the method 300 includes receiving a color image from an imaging system. For example, the processor 110 can receive a color image (e.g., the color image 202, the color image 212, the color image 220, and the color image 226) from the imaging system 106. As discussed above with FIGS. 2A, 2B, 2C, and 2D, the color image can include a traffic indicator having a color portion. For example, in FIG. 2A the color image 202 includes the traffic indicator 204. The red light signal 206 can be a color portion of the traffic indicator 204 as the red light signal 206 is emitting a red colored light in the example shown in the color image 202. This is in contrast to the yellow light signal 208 and the green light signal 210, which are not activated (i.e., not emitting a colored light).

In the methods and systems discussed herein, the color image received from the imaging system 106 can be processed using an RGB color model to recognize a color of the color portion of the traffic indicator, namely, a red color and a green color. Thus, each pixel (not shown) in the color image can be described by intensities for red, green, and blue. Specifically, each pixel in the color image can be defined by a red-scale value, a green-scale value, and a blue-scale value. In the embodiments discussed herein, a grayscale intensity value of each pixel of the color image can be used in the image processing. Thus, at block 304, the method 300 can optionally include generating a grayscale image of the color image. More specifically, the processor 110 can convert and/or generate the color image to a grayscale image to determine the grayscale intensity value of each pixel in the color image. Thus, each pixel in the grayscale image has a grayscale intensity value, which can be calculated based on the red-scale, green-scale, and blue-scale values of the pixel in the color image.

The grayscale intensity value can be used to extract red color components and green color components from the color image. Accordingly, at block 306, the method 300 includes extracting red color components from the color image by subtracting a grayscale intensity value of each pixel in the color image from a red-scale value of each pixel in the color image. Thus, the processor 110 can extract the red color components from the color image by subtracting the grayscale intensity value of each pixel in the color image from the respective red-scale values of each pixel in the color image. Similarly, at block 308, the method 300 includes extracting green color components from the color image by subtracting the grayscale intensity value of each pixel in the color image from a green-scale value of each pixel in the color image. Said differently, the processor 110 can extract green color components from the color image by subtracting the grayscale intensity value of each pixel in the color image from the respective green-scale value of each pixel in the color image.

Red colors and green colors can be recognized using further image processing based on the extracted red components and the extracted green components. Thus, at block 310, the method includes performing Binary Large Object (blob) analysis based on the red color components and the green color components. In one embodiment, the processor 110 performs blob analysis based on the red color components and the green color components using connected component algorithms, for example, algorithms based on 4-connectivity or 8-connectivity. It is understood that other types of algorithms for blob analysis can also be implemented. Further, it is understood that other types of image processing can be performed at block 310, for example image filtering techniques, for example, morphological operations, which will be described in more detail herein. Further it is understood that traffic indicator classification and described above with FIG. 2E can also be performed based on the blob analysis.

Blob analysis will now be described in more detail with respect to FIGS. 1, 4A, 4B, and 4C. FIG. 4A is a flow chart of a method 400 for performing blob analysis for red color according to an exemplary embodiment. At block 404, the method 400 includes converting the red color components to binary components. Said differently, the red color components are converted into a binary image. In one embodiment, which will be described in further detail with FIG. 4C, the red color components are converted in to a binary image using image binarization using adaptive thresholding based on light intensity.

Based on the connected component algorithms discussed above, at block 406, the processor 110 identifies red color blobs based on the red color components. At block 408, a size of each of the red color blobs identified at block 406 is compared to a predetermined threshold. A size of each of the red color blob can be a geometric parameter, for example, a pixel number, a number of connected pixels, a height or a width of a blob, among others. By comparing the size of each of the red color blobs to a predetermined threshold, blobs are filtered out that are not likely to be a color portion from a traffic indicator (e.g., not a red light from a traffic light or a red light from a brake light). If the determination at block 408 is NO, a red blob has not been detected in the color image and a first output value (e.g., stored at the memory 112 and/or disk 114) can be set to false (e.g., 0) at block 410. Otherwise, if the determination at block 408 is YES, a red blob has been detected in the color image and the first output value (e.g., stored at the memory 112 and/or disk 114) can be set to true (e.g., 1) at block 412. Thus, upon detecting a red blob, the processor 110 can set the first output value to true. At block 414, the method 400 can return to block 310 of FIG. 3.

In another embodiment, if the determination at block 408 is YES, the blob can be verified with image segmentation. Referring now to FIG. 4C, a method 416 for image segmentation is shown according to an exemplary embodiment. It is understood that in some embodiments, blocks 418 and 420 can be processed in parallel with blocks 404, 406, and 408 of FIG. 4A. At block 418, the method 416 includes performing image segmentation on the red color components using adaptive thresholding (e.g., light intensity). Thus, in one some embodiments, the red color components are converted to a binary image using segmentation based on light intensity. Additionally, at block 418, the method 416 includes performing edge detection on the binary image.

Based on the edge detection, at block 420, closed shaped are identified and filled using morphological operations. The closed shapes, in some embodiments, can be identified as having a closed shape of a light indicator (e.g., traffic light, brake lights). The resulting segmented binary image based on the light intensity segmentation and the edge detection contains only the identified closed shapes with light radiating areas in the binary image. The identified closed shapes are then compared to the blobs identified in method 400. Specifically, it is determined if the identified closed shape overlaps the identified blob. Said differently, it is determined If the identified closed shapes in the segmented binary image share a common area with the identified blobs. If the determination at block 422 is NO, the method 416 proceeds to block 410 of FIG. 4A, and the first output value can be set to false at block 410. Otherwise, if the determination at block 422 is YES, the method 416 proceeds to block 412 of FIG. 4A, and the processor 110 can set the first output value to true.

Figure 3:
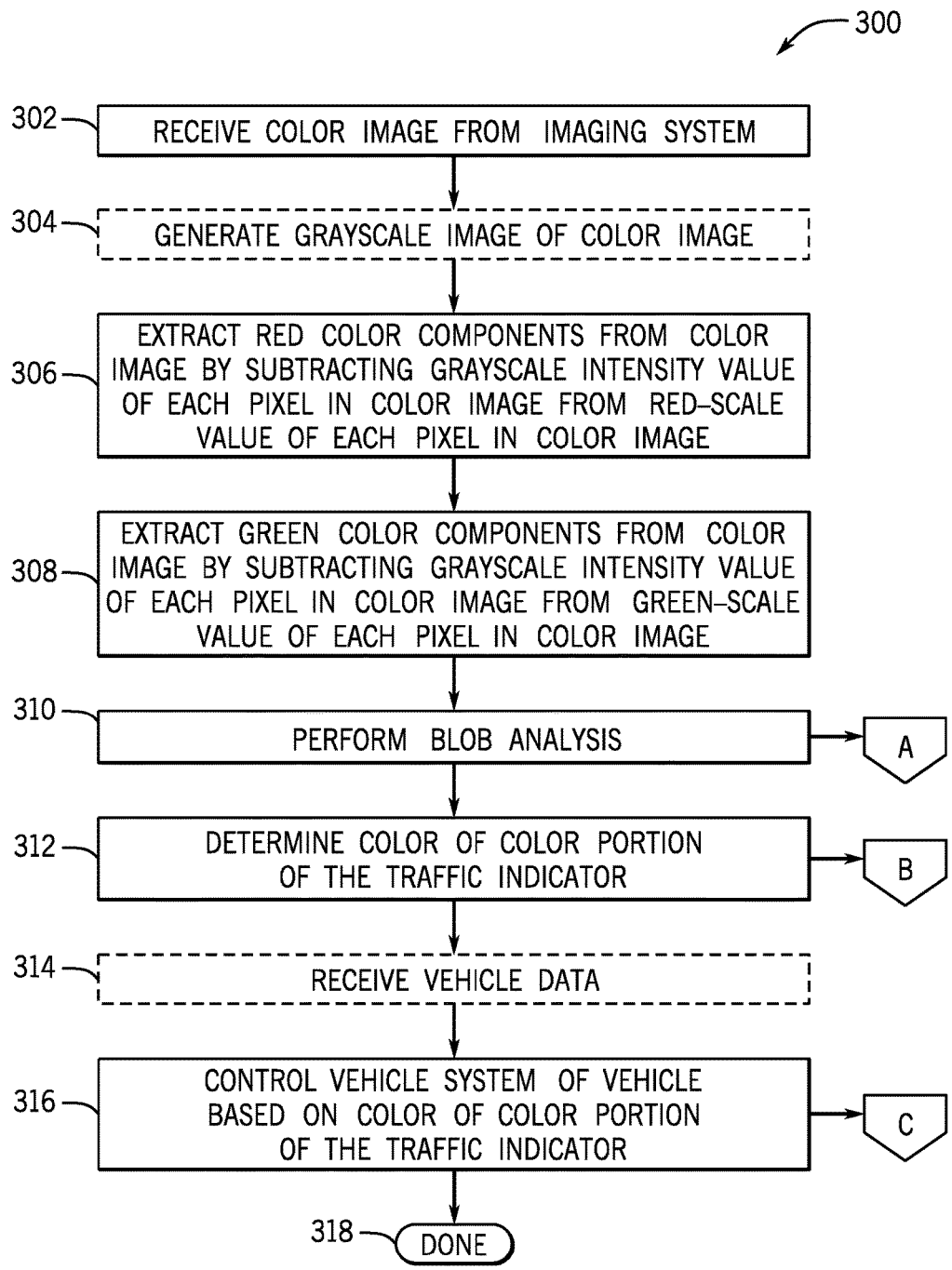
FIG. 3 is a flow chart of a method for vehicle control based on red color and green color detection according to an exemplary embodiment.
Figure 4B:
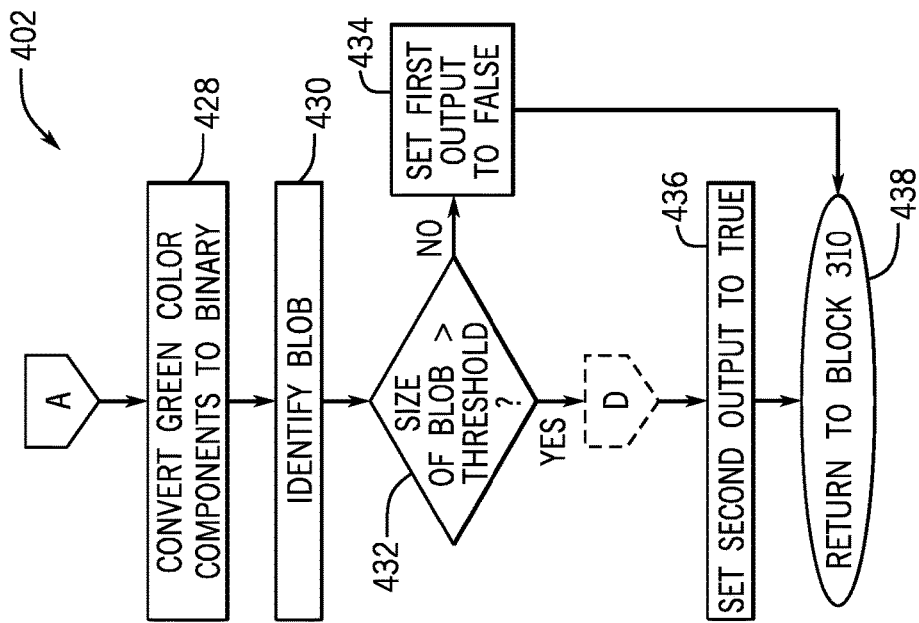
FIG. 4B is a flow chart of a method for performing blob analysis for green color according to an exemplary embodiment.
Figure 4A:
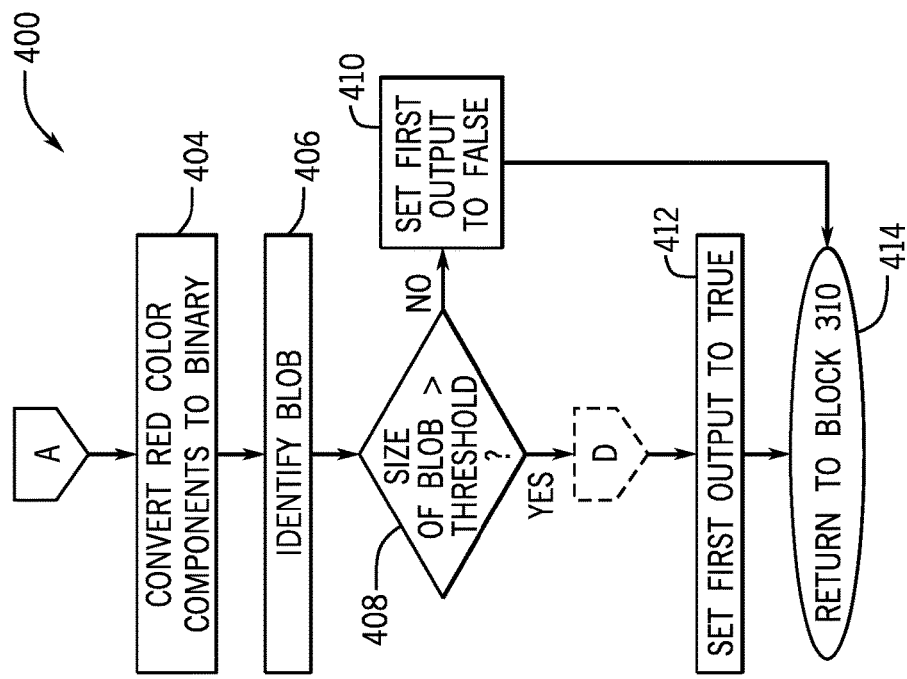
FIG. 4A is a flow chart of a method for performing blob analysis for red color according to an exemplary embodiment.
Figure 4C:
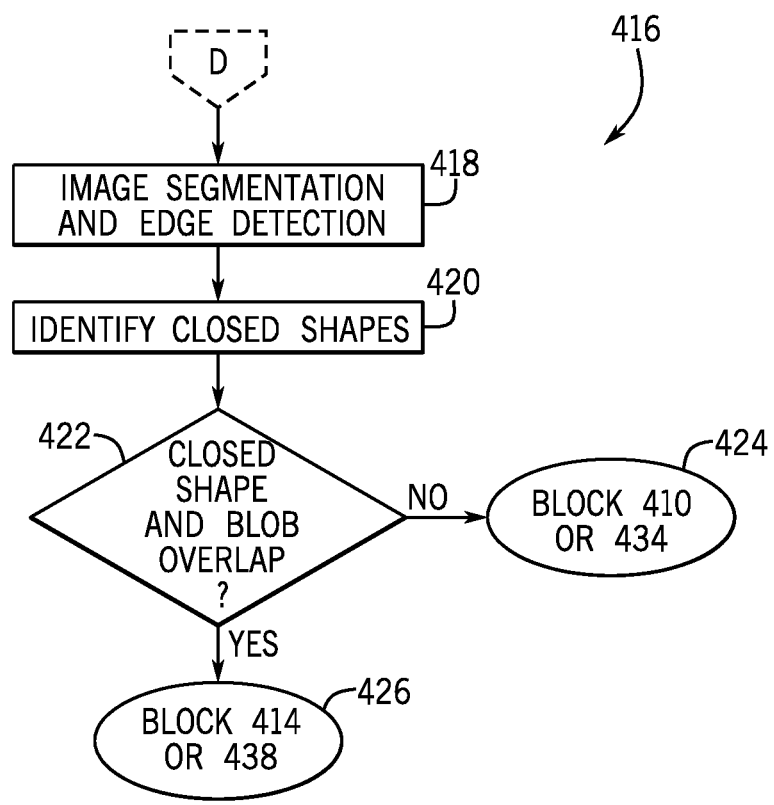
FIG. 4C is a flow chart of a method for performing image segmentation according to an exemplary embodiment.

Referring now to FIG. 4B, a flow chart of a method 402 for performing blob analysis for green color according to an exemplary embodiment is shown. It is understood that the processor 110 can perform blob analysis for red color as described in FIG. 4A in parallel with blob analysis for green color as described here with FIG. 4B. At block 428, the method 402 includes converting the green color components to binary components. Based on the connected component algorithms discussed above, at block 430, the processor 110 identifies green color blobs based on the green color components. At block 432, a size of each of the green color blobs identified at block 430 are compared to a predetermined threshold. A size of each of the red color blob can be a geometric parameter, for example, a pixel number, a number of connected pixels, a height or a width of a blob, among others. By comparing the size of each of the green color blobs to a predetermined threshold, blobs are filtered out that are not likely to be a color portion from a traffic indicator (e.g., not a green light from a traffic light). If the determination at block 432 is NO, a green color has not been detected in the color image and a second output value (e.g., stored at the memory 112 and/or disk 114) can be set to false (e.g., 0) at block 434. Otherwise, if the determination at block 432 is YES, a green blob has been detected in the color image and the second output value (e.g., stored at the memory 112 and/or disk 114) can be set to true (e.g., 1) at block 436. Thus, upon detecting a green blob, the processor 110 can set the second output value to true. At block 436, the method 400 can return to block 310 of FIG. 3.

In another embodiment, if the determination at block 432 is YES, the blob can be verified with image segmentation, as discussed above with the method 416 shown in FIG. 4C. Referring again to FIG. 4C, it is understood that in some embodiments, blocks 418 and 420 can be processed in parallel with blocks 428, 430, and 432 of FIG. 4B. At block 418, the method 416 includes performing image segmentation on the green color components using adaptive thresholding (e.g., light intensity). Thus, in one some embodiments, the green color components are converted to a binary image using segmentation based on light intensity. Additionally, at block 418, the method 416 includes performing edge detection on the binary image.

Based on the edge detection, at block 420, closed shaped are identified and filled using morphological operations. The closed shapes, in some embodiments, can be identified as having a closed shape of a light indicator (e.g., traffic light, brake lights). The resulting segmented binary image based on the light intensity segmentation and the edge detection contains only the identified closed shapes with light emitting areas in the binary image. The identified closed shapes are then compared to the blobs identified in method 400. Specifically, it is determined if the identified closed shape overlaps the identified blob. Said differently, it is determined If the identified closed shapes in the segmented binary image share a common area with the identified blobs. If the determination at block 422 is NO, the method 416 proceeds to block 434 of FIG. 4B, and the first output value can be set to false at block 434. Otherwise, if the determination at block 422 is YES, the method 416 proceeds to block 436 of FIG. 4B, and the processor 110 can set the first output value to true.

Figure 5:
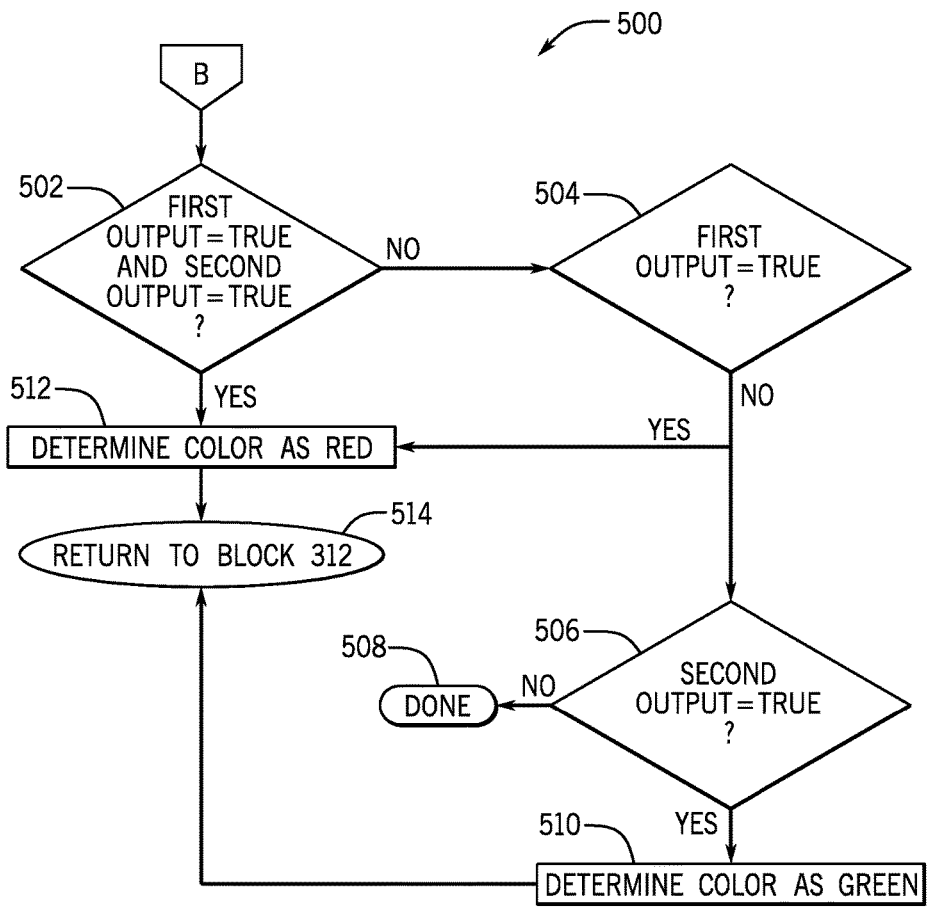
FIG. 5 is a flow chart of a method for determining a color of a color portion of a traffic indicator according to an exemplary embodiment.

Referring again to FIG. 3, the method 300 includes at block 312, determining, based on the blob analysis, a color of the color portion of the traffic indicator. In particular, the output values (i.e., the first output value and the second output value) are analyzed by the processor 110 to determine the color of the color portion in the color image. It is understood that more than one color in the color image can be determined and that more than one color portion and/or traffic indicator can be included in the color image. Block 312 will now be described with reference to FIG. 5, which illustrates a method 500 for determining a color of a color portion of a traffic indicator according to an exemplary embodiment. At block 502, the method 500 includes determining if the first output value is equal to true and the second output value is equal to true. Said differently, the processor 110 can determine whether a red color and a green color are simultaneously detected in the color image (e.g., in a single frame). If the determination at block 502 is NO, the method 500 proceeds to block 504 to evaluate the first output value and the second output value separately to determine if either value is set to true.

Otherwise, if the determination at block 502 is YES, the color of the color portion of the traffic indicator is determined to be a red color at block 512, and the method 500 at block 514 can return to block 312 of FIG. 3. Said differently, upon the processor 110 detecting a red color and a green color simultaneously in the color image (i.e., the first output value is true and the second output value is true), the color of the color portion of the traffic indicator is determined to be the red color. Thus, red color is given priority in situations where the color image includes red and green color portions. As an illustrative example, and with reference to FIG. 2D, the color image 226 includes a green color (i.e., the green light signal 210) and a red color (i.e., the first traffic indicator 216a, the second traffic indicator 216b, and the third traffic indicator 216c). Accordingly, although both the first output value is true and the second output value is true for the color image 226, the determination of the color portion of the traffic indicator is determined to be the red color (e.g., the red color is given priority over the green color) at block 512.

Referring again to block 504, it is determined whether the first output value is equal to true. If the determination at block 504 is YES, the color of the color portion of the traffic indicator is determined to be red at block 512, and the method 500 can return to block 312 of FIG. 3. If the determination at block 504 is NO, the method 500 proceeds to block 506 to determine whether the second output value is equal to true. If the determination at block 506 is NO, the method 500 can terminate at block 508. Otherwise, if the determination at block 506 is YES, the color of the color portion of the traffic indicator is determined to be green at block 510, and the method 500 can return to block 312 of FIG. 3.

As discussed herein and with reference again to FIG. 3, control of one or more of the vehicle systems 108 can be based on the color determined at block 312 as well as information about the vehicle 102. Accordingly, at block 314, the method 300 can optionally include receiving vehicle data, from for example, the vehicle systems 108. In some embodiments the vehicle data can include data about a driver (not shown) of the vehicle 102. For example, the vehicle data can include a head pose of the driver of the vehicle 102, received from, for example, a driver monitoring system and/or a head tracking system. In other embodiments, the vehicle data can include the speed of the vehicle 102 received from, for example, an accelerometer. The speed of the vehicle 102 can be used to determine whether the vehicle 102 is in a moving state or a non-moving (e.g., stopped) state. In other embodiments, braking information from a braking system can be used to determine whether the vehicle is in a moving state or a non-moving state.

At block 316, the method 300 includes controlling a vehicle system of a vehicle based on the color of the color portion of the traffic indicator. More specifically, the processor 110 can execute control of one or more of the vehicle systems 108 based on the color of the color portion of the traffic indicator. For example, if the color portion of the traffic indicator is red, the processor 110 can control one or more vehicle systems 108 to provide an alert (e.g., visual, audible, tactile) to the driver. As an illustrative example, if the vehicle 102 is approaching the traffic indicator 222 of FIG. 2C, the processor 110 can determine the color of the color portion 224 is red, and the vehicle systems 108 can be controlled to alert the driver of the traffic indicator 222. Further, as discussed above, in some embodiments, controlling the vehicle system 108 of the vehicle 102 can include controlling the vehicle system 108 of the vehicle 102 based on the color of the color portion of the traffic indicator determined at block 312 and the vehicle data received at 314.

Figure 6:
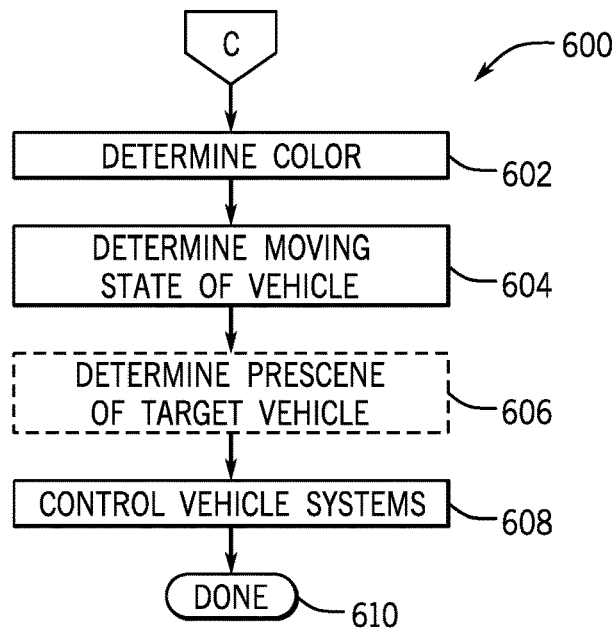
FIG. 6 is a flow chart of a method for controlling a vehicle system based on a color of the color portion of a traffic indicator according to an exemplary embodiment.

Exemplary control based on the color of the color portion of the traffic indicator and/or the vehicle data will now be described with respect to FIGS. 6 and 7. FIG. 6 is a flow chart of a method 600 for controlling the vehicle system 108 based on a color of the color portion of a traffic indicator according to an exemplary embodiment. At block 602, the method 600 includes determining the color of the color portion of the traffic indicator as discussed with block 312 of FIG. 3. For example, at block 602, the processor 110 can determine if the color is a red color or a green color. At block 604, the method 600 includes determining a moving state of the vehicle 102. For example, the processor 110 can determined if the vehicle 102 is in a moving state (e.g., the vehicle 102 is moving and/or the vehicle 102 is travelling above a predetermined speed) or a non-moving state (e.g., the vehicle 102 is stopped and/or the vehicle 102 is travelling below a predetermined speed). A moving state of the vehicle 102 can be determined based on vehicle data (e.g., braking information, speed information) from the vehicle systems 108 (e.g., received at block 314 of FIG. 3). The method 600 can then proceed to block 608 and/or optionally proceed to block 606.

At block 608, the method 600 includes controlling the vehicle system 108 based on a color of the color portion of a traffic indicator and a moving state of the vehicle 102. As an illustrative example, if the color is a red color and the vehicle 102 is in a moving state, the processor 110 can control one or more of the vehicle systems 108 to provide an alert (e.g., visual, audio, tactile) to the driver to inform the driver to slow down and/or stop the vehicle 102. Alternatively, the processor 110 can provide autonomous control of the vehicle systems 108. For example, upon determining the color of the color portion of the traffic indicator is red and the vehicle 102 is in a moving state, the processor 110 can control the braking system to automatically begin stopping and/or slowing down the vehicle 102. As an illustrative example, the braking system can be controlled to prefilling one or more brake lines with brake fluid prior to help increase the reaction time of the braking system as the driver depresses the brake pedal In another embodiment, at block 608 the method 600 can include controlling the vehicle systems 108, based on the green color of the color portion of the traffic indicator and a moving state of the vehicle 102. As an illustrative example, the vehicle 102 can be stopped (i.e., non-moving state) at an intersection including a traffic indicator similar to the traffic indicator 204 in FIG. 2A. However, in this example, and in contrast to the example shown in FIG. 2A, the green light signal 210 is activated (e.g., emitting a green light) and the red light signal 206 is deactivated (e.g., not emitting a light). Accordingly, the processor 110 can control the vehicle systems 108 to alert the driver to start moving the vehicle 102. For example, the processor 110 can control the vehicle systems 108 to provide a visual, audio, or tactile alert. Alternatively, the processor 110 can provide autonomous control of the vehicle systems 108. For example, upon determining the color of the color portion of the traffic indicator is green, the processor 110 can control the vehicle systems 108 to automatically begin moving the vehicle 102 in a forward direction.

In some embodiments, upon detecting the green color and detecting the vehicle 102 is in a non-moving state, the processor 110 can control the vehicle systems 108 after a predetermined amount of time. For example, after five (5) seconds, the processor 110 can verify the vehicle 102 is still in a non-moving state, and then provide appropriate control of the vehicle 102. If the vehicle 102 is in a moving state after the predetermined amount of time, the processor 110 may not control the vehicle systems 108 and the method 600 can terminate.

As mentioned above, the method 600 can optionally include block 606. At block 606, the method 600 can include determining if a target vehicle exists in front of the vehicle 102 (e.g., FIG. 2B, 2D). The determination at block 606 can be made based on vehicle data from the vehicle systems 108, for example, vehicle data from proximity sensors, radar sensors, laser sensors, external cameras, among others. The method 600 can then proceed to block 608, where the method 600 includes controlling the vehicle systems 108 based on the color of the color portion, a moving state of the vehicle 102, and the presence of a target vehicle. As an illustrative example, the vehicle 102 may be stopped (i.e., non-moving state) at an intersection with no target vehicle located in front of the vehicle 102. Upon determining the color of the color portion of the traffic indicator is green, the processor 110 can control the vehicle systems 108 to provide an alert to the driver to inform the driver to begin moving the vehicle 102. Alternatively, the processor 110 can provide autonomous control of the vehicle systems 108. For example, upon determining the color of the color portion of the traffic indicator is green and no target vehicle is located in front of the vehicle 102, the processor 110 can control the vehicle systems 108 to automatically begin moving the vehicle 102 in a forward direction. As discussed above, the processor 110 can execute the control after a predetermined amount of time. In this embodiment, after the predetermined amount of time has lapsed, the processor 110 can verify the state of the vehicle 102 state is a non-moving state and verify a target vehicle is not present in front of the vehicle 102, and then provide appropriate control of the vehicle 102. If the vehicle 102 is in a moving state after the predetermined amount of time, the processor 110 may not control the vehicle systems 108 and the method 600 can terminate.

Figure 7:
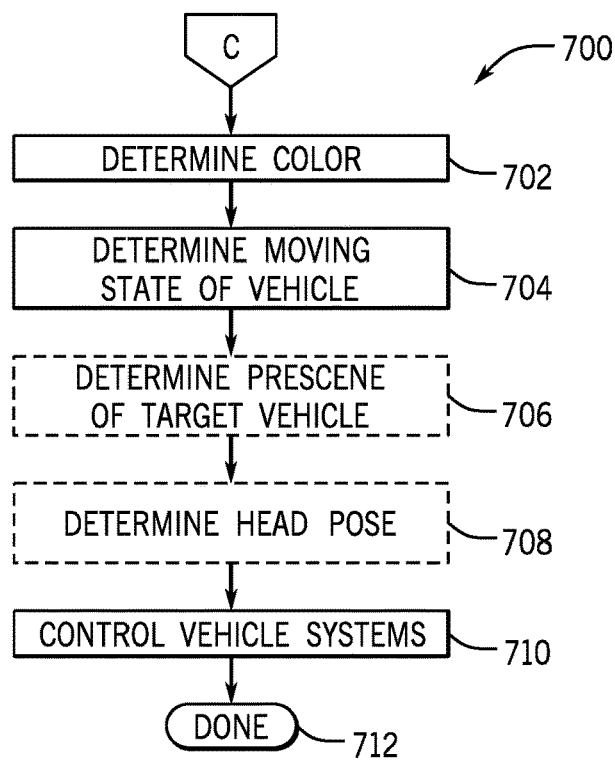
FIG. 7 is a flow chart of another method for controlling a vehicle system based on a color of the color portion of a traffic indicator according to an exemplary embodiment.

Referring now to FIG. 7, a flow chart of a method 700 for controlling the vehicle system 108 based on a color of the color portion of a traffic indicator according to another exemplary embodiment will be described. In particular, the method 700 includes controlling the vehicle system 108 based on the color of the color portion of the traffic indicator, vehicle information, and information about a driver. At block 702, the method 700 includes determining a color of the color portion of the traffic indicator (e.g., as described at block 312 of FIG. 3). For example, at block 602, the processor 110 can determine if the color is a red color or a green color. At block 704, the method 700 includes determining a moving state of a vehicle. For example, the processor 110 can determined if the vehicle 102 is in a moving state (e.g., the vehicle 102 is moving and/or the vehicle 102 is travelling above a predetermined speed) or a non-moving state (e.g., the vehicle 102 is stopped and/or the vehicle 102 is travelling below a predetermined speed). A moving state of the vehicle 102 can be determined based on vehicle data (e.g., braking information, speed information) from the vehicle systems 108 (e.g., received at block 314 of FIG. 3).

The method 700 can then proceed to block 710 and/or optionally proceed to blocks 706 and 708. At block 706, the method 700 includes determining if a target vehicle exists in front of the vehicle 102 (e.g., FIG. 2B, 2D). The determination at block 706 can be made based on vehicle data from the vehicle systems 108, for example, vehicle data from proximity sensors, radar sensors, laser sensors, external cameras, among others. At block 708, the method 700 includes determining a head pose of a driver. For example, as discussed herein, the processor 110 can receive information about a driver of the vehicle 102 from the vehicle systems 108 (e.g., at block 314 of FIG. 3). In some embodiments, head pose data can be received from driving monitoring systems and/or head tracking systems. In some embodiments, the processor 110 can determine a direction of the head pose of a driver, for example, upward, downward, to the left and/or to the right. In some embodiments, If the head pose of the driver is in a downward direction, it may be determined that the driver is distracted from the primary task of driving the vehicle 102.

At block 710, the method 700 includes controlling the vehicle systems 108, based on the color of the color portion of the traffic indicator, a moving state of a vehicle, the presence of a target vehicle, and driver information (e.g., head pose). As an illustrative example, upon determining the color of the color portion of the traffic indicator is green, the vehicle 102 is in a non-moving state (e.g., stopped and/or travelling below a predetermined speed), a target vehicle is not present in front of the vehicle 102, and the head pose of the driver is directed in a downward direction, the processor 110 can control the vehicle systems 108 to provide an alert to the driver to inform the driver to begin moving the vehicle 102. Alternatively, the processor 110 can provide autonomous control of the vehicle systems 108. For example, upon determining the color of the color portion of the traffic indicator is green, no target vehicle is located in front of the vehicle 102, and the head pose of the driver is directed in a downward direction, the processor 110 can control the vehicle systems 108 to automatically begin moving the vehicle 102 in a forward direction. In this illustrative example, the downward direction of the head pose can indicate the driver is not paying attention to a green traffic light. Thus, the vehicle systems 108 are controlled to alert the driver.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for vehicle control, comprising:
    receiving a color image from an imaging system, the color image including a traffic indicator having a color portion;
    extracting red color components from the color image by subtracting a grayscale intensity value of each pixel in the color image from a red-scale value of each pixel in the color image;
    extracting green color components from the color image by subtracting the grayscale intensity value of each pixel in the color image from a green-scale value of each pixel in the color image;
    performing blob analysis based on the red color components and the green color components;
    determining, based on the blob analysis, a color of the color portion of the traffic indicator; and
    controlling a vehicle system of a vehicle based on the color of the color portion of the traffic indicator.

2. The computer-implemented method of claim 1, further including converting the color image to a grayscale image to determine the grayscale intensity value of each pixel in the color image.

3. The computer-implemented method of claim 1, wherein performing the blob analysis includes setting a first output value to true upon detecting a red blob and a second output value to true upon detecting a green blob.

4. The computer-implemented method of claim 1, wherein determining, based on the blob analysis, the color of the color portion of the traffic indicator further includes upon detecting a red color and a green color simultaneously in the color image, the color of the color portion of the traffic indicator is determined to be the red color.

5. The computer-implemented method of claim 3, wherein upon determining the first output value is true and the second output value is true, the color of the color portion of the traffic indicator is determined to be a red color.

6. The computer-implemented method of claim 1, further including receiving vehicle data from the vehicle.

7. The computer-implemented method of claim 6, wherein controlling the vehicle system of the vehicle further includes controlling the vehicle system of the vehicle based on the color of the color portion of the traffic indicator and the vehicle data.

8. The computer-implemented method of claim 6, wherein the vehicle data includes a head pose of a driver of the vehicle and braking information, and upon determining the head pose is in a downward direction, the vehicle is in a non-moving state based on the braking information, and the color of the color portion of the traffic indicator is green, controlling the vehicle system of the vehicle includes providing an alert in the vehicle.

9. The computer-implemented method of claim 6, wherein the vehicle data includes braking information, and upon determining the vehicle is in a moving state based on the braking information and the color of the color portion of the traffic indicator is red, controlling the vehicle system of the vehicle includes providing an alert in the vehicle.

10. A vehicle image processing system, comprising:
    an imaging system which captures a color image, the color image including a traffic indicator having a color portion; and
    a processor operably connected for computer communication to the imaging system, wherein the processor receives the color image from the imaging system, wherein the processor extracts red color components from the color image and green color components from the color image by subtracting grayscale intensity values of each pixel in the color image from respective red-scale values and green-scale values of each pixel in the color image,
    wherein the processor performs blob analysis based on the red color components and the green color components, and determines, based on the blob analysis, a color of the color portion of the traffic indicator, wherein the processor executes control of a vehicle system of a vehicle based on the color of the color portion of the traffic indicator.

11. The vehicle image processing system of claim 10, further including the processor identifying a red blob from the blob analysis based on the red color components by the processor comparing a size of each blob identified based on the red color components to a predetermined threshold.

12. The vehicle image processing system of claim 11, further including the processor identifying a green blob from the blob analysis based on the green color components by the processor comparing a size of each blob identified based on the green color components to the predetermined threshold.

13. The vehicle image processing system of claim 12, wherein the processor determines the color of the color portion of the traffic indicator based on the identified red blob and the identified green blob.

14. The vehicle image processing system of claim 10, wherein the processor identifies red blobs and green blobs based on the blob analysis and upon determining the color image includes red blobs and green blobs, the processor determines the color of the color portion of the traffic indicator to be red.

15. The vehicle image processing system of claim 10, further including the processor receiving vehicle data from the vehicle and the processor executes control of the vehicle system of the vehicle based on the color of the color portion of the traffic indicator and the vehicle data.

16. A non-transitory computer-readable storage medium including instructions that when executed by a processor, cause the processor to:
    receive a color image from an imaging system, the color image including a traffic indicator having a color portion;
    extract red color components from the color image by subtracting a grayscale intensity value of each pixel in the color image from a red-scale value of each pixel in the color image;

extract green color components from the color image by subtracting the grayscale intensity value of each pixel in the color image from a green-scale value of each pixel in the color image;
perform blob analysis based on the red color components and the green color components;
determine, based on the blob analysis, a color of the color portion of the traffic indicator; and
control a vehicle system of a vehicle based on the color of the color portion of the traffic indicator.

17. The non-transitory computer-readable storage medium of claim 16, wherein performing the blob analysis includes set a first output value to true upon detecting a red blob and a second output value to true upon detecting a green blob.

18. The non-transitory computer-readable storage medium of claim 16, wherein determining, based on the blob analysis, the color of the color portion of the traffic indicator further includes upon detecting a red color and a green color simultaneously in the color image, the color of the color portion of the traffic indicator is determined to be the red color.

19. The non-transitory computer-readable storage medium of claim 17, wherein upon determining the first output value is true and the second output value is true, the color of the color portion of the traffic indicator is determined to be a red color.

20. The non-transitory computer-readable storage medium of claim 16, further including receive vehicle data from the vehicle and controlling the vehicle system further includes controlling the vehicle system based on the color of the color portion of the traffic indicator and the vehicle data.

* * * * *